United States Patent [19]

Kling et al.

[11] Patent Number: 4,673,245
[45] Date of Patent: Jun. 16, 1987

[54] OPTICAL CONNECTOR, PROCESS FOR THE PRODUCTION OF SAID CONNECTOR AND FIBRE-FIBRE AND DIODE-FIBRE CONNECTIONS OBTAINED WITH THIS CONNECTOR

[75] Inventors: Bernard Kling, Boissy Saint Yon; Roger Mongin; Michel Leguennec, both of Paris, all of France

[73] Assignee: Commissariat a l'Energie Atomique, Paris, France

[21] Appl. No.: 618,197

[22] Filed: Jun. 7, 1984

[30] Foreign Application Priority Data

Jun. 8, 1983 [FR] France .................. 83 09511

[51] Int. Cl.⁴ .............................. G02B 6/36
[52] U.S. Cl. .................. 350/96.20; 350/320
[58] Field of Search .......... 350/96.20, 96.21, 96.22, 350/320

[56] References Cited

U.S. PATENT DOCUMENTS

| | | | |
|---|---|---|---|
| 3,954,338 | 5/1976 | Hennel et al. | 356/138 |
| 4,060,309 | 11/1977 | Le Noane et al. | 350/96.21 X |
| 4,101,197 | 7/1978 | Kent et al. | 350/96.17 |
| 4,192,056 | 3/1980 | Logan et al. | 350/96.21 X |
| 4,193,664 | 3/1980 | Ellwood | 350/96.21 |
| 4,265,511 | 5/1981 | Nicia et al. | 350/96.20 X |
| 4,289,374 | 9/1981 | Franken et al. | 350/96.20 |
| 4,362,360 | 12/1982 | Mannschke | 350/96.20 |
| 4,432,603 | 2/1984 | Morency et al. | 350/96.21 |

FOREIGN PATENT DOCUMENTS

| | | | |
|---|---|---|---|
| 0063085 | 10/1982 | European Pat. Off. | |
| 2923490 | 12/1980 | Fed. Rep. of Germany | 350/96.20 |
| 3042609 | 6/1982 | Fed. Rep. of Germany | |
| 52-101051 | 8/1977 | Japan | |
| 53-71522 | 12/1979 | Japan | |
| 1486681 | 9/1977 | United Kingdom | 350/96.20 |

OTHER PUBLICATIONS

"A New Demountable Connector Developed for a Trial Optical Transmission System," by Suzuki et al, Institute of Electronics & Communication Engineers of Japan, International Conf. on Integrated Optics & Optical Fiber Comm., Jul. 1977, Techn. Digest, pp. 351-354.

*Primary Examiner*—John Lee
*Attorney, Agent, or Firm*—Michael N. Meller

[57] ABSTRACT

The connector comprises an optical fibre (2) provided with a core (5), a cylindrical termination (3) for containing the connecting end (11) of the fibre and a mechanical connection assembly (4). The core connection end (12) is made to coincide with the axis (10) of the termination and is then fixed with respect to the latter, and the active ends (36, 39) of the termination and of the fibre are then polished. The coincidence is brought under optical control by acting on the means (14) for displacing and fixing the fibre in the termination.

6 Claims, 5 Drawing Figures

OPTICAL CONNECTOR, PROCESS FOR THE PRODUCTION OF SAID CONNECTOR AND FIBRE-FIBRE AND DIODE-FIBRE CONNECTIONS OBTAINED WITH THIS CONNECTOR

The present invention relates to an optical connector, a process for producing said connector and fibre-fibre and diode-fibre connections obtained with said connector. Thus, it more particularly applies to the formation of connections between optical fibres or between such fibres and light emitters or receivers.

It is known that in most cases an optical fibre comprises a core and a sheath surrounding said core. The sheath has an optical index below that of the core, the core and the sheath being, for example, made from silica. In certain cases, the optical fibre does not have a sheath and the coincides with its core. Different protective sheaths, e.g. made from plastics, can surround the optical fibre in the manner to be shown hereinafter.

Optical connectors are known which make it possible to produce a connection between two optical fibres in such a way that light can pass from one fibre to the next and it is known that a poor coaxiality of the cores of two fibres can cause a problem of light insertion loss from one fibre to the next.

The object of the present invention is to obviate this problem by proposing an optical connector making it possible to produce good optical connections in which the cores of the connected fibres have a perfect coaxiality.

The present invention firstly relates to a process for the production of an optical connector, which incorporates an optical fibre provided with a core, a termination serving to contain the connection end of the fibre and whose outer surface is cylindrical, thus having an axis of symmetry, and a mechanical connection assembly. The process comprises the steps of bringing about coincidence between the connection end of the optical fibre core and said axis of symmetry of the cylinder, while optically monitoring the coincidence, followed by the fixing of the core connection end relative to the termination, characterized in that it also consists of polishing the active endfaces of the termination and the fibre and joining the termination and the mechanical connection assembly, the latter having previously been fitted, in that the termination is provided with means for displacing and fixing the optical fibre connection end within the termination and in that the bringing about of coincidence is obtained by placing the termination in a bearing vee, by injecting light into the optical fibre core by the other end thereof, while rotating the termination in the bearing vee, the active endface of the optical fibre core then defining a circle centered on the axis of the cylinder, and by displacing the optical fibre connection end within the termination until the radius of said circle is cancelled out.

The term "optical fibre connection end" (or "optical fibre core") is understood to mean the end of the fibre (or the core of the fibre) to be connected to the end of another fibre (or the core of another fibre) or to a light emitter or receiver.

The term "active end face of the termination" (or "of the fibre", "of the core of the fibre") is understood to mean the surface of the termination (or the fibre, or the core of the fibre) which supplies or which receives the light in a connection. In the process according to the invention, the active endfaces of the termination and fibre are polished in a very precise manner and preferably so as to only form one planar surface.

The term "cancel out the radius of the circle" is understood to mean producing a radius of magnitude below a given value. In other words, a certain tolerance is specified for the radius of the circle and any connector is accepted for which this radius is less than a certain value, e.g. less than 1 micron.

According to a preferred feature of the invention, the optical fibre connection end is fixed in a rigid protective tube before being introduced into the termination and the displacement and fixing of said optical fibre connection end in the termination are brought about by means of the rigid protective tube.

According to a special feature of the invention, the displacement and fixing means are adjusting screws able to secure the rigid protective tube along a circumferential surface thereof.

The present invention also relates to an optical connector incorporating an optical fibre provided with a core, a termination for containing the fibre connection end and whose outer surface is cylindrical, thus having an axis of symmetry, the optical fibre connection end being fixed in the termination, and a mechanical connection assembly, the connection end of the optical fibre core coinciding with the axis of symmetry of the cylinder, characterized in that the active endfaces of the termination and the fibre are polished, and in that the termination is provided with means for displacing and fixing the optical fibre connection end within the termination, coincidence being brought about using optical monitoring, prior to the fixing of the optical fibre connection end in the termination and by means of said displacement and fixing means.

The connectors obtained according to the invention consequently make it possible to produce good optical connections. It is in fact merely necessary to make the opposing terminations of two connectors coaxial according to the invention in order to bring about perfect coaxiality between the cores of the fibres of these connectors.

The invention also relates to a biunial connection between N pairs of optical fibres, N being an integer at least equal to one, said connection incorporating a first group of N optical fibres, a second group of N optical fibres and means for the pairwise connection of the connectors of the first group with the connectors of the second group so as to form N pairs of connectors, characterized in that each connector corresponds to the connector according to the invention, in that for each pair the terminations of two paired conductors are identical and have active endfaces which are complementary to one another and in that the connecting means comprise a centering core provided with N calibrating holes, each calibrated hole being able to receive the terminations of two connectors of one of said pairs, the terminations being positioned in the calibrated holes in such a way that their active endfaces are in contact with one another, so as to enable transmission of light from one connector to the next.

The term "active endfaces complementary to one another" is understood to mean planar active endfaces which are also parallel to one another when the terminations of two connectors are positioned facing one another and are rendered coaxial.

The number N can be equal to one, the connection then being called "monochannel". The number N can also exceed one, the connection then being called "multichannel".

Obviously, the terminations of the connectors belonging to two separate pairs can be different or, in another simpler construction, it is possible to use identical N connectors, the N calibrated holes then being identical to one another.

Finally, the invention relates to a connection between at least one diode and at least one optical fibre, said connection incorporating at least one optical connector and means for connecting the diode and the connector, characterized in that the connector coincides with the connector according to the invention and in that the means for connecting the diode to the connector comprise a centering core provided with at least one pair of coaxial recesses issuing onto the outside of the centering core, arranged in opposition and communication with one another, one of the two recesses being calibrated and able to receive the connector termination, the other recess being able to receive the diode, the termination and the diode being disposed in their respective recesses in such a way that their active endfaces opose one another, so as to be able to obtain a light exchange between the diode and the optical fibre of the connector.

The diode can be a light-emitting diode, e.g. an injection luminescence diode or a laser diode for injecting light into the optical fibre. The term "active endface of the diode" is understood to mean in this case the surface of the diode which emits light.

The diode can also comprise a light receiving diode, e.g. a PIN photodiode for receiving the light emitted by the optical fibre. The term "active endface of the diode" then is understood to mean the surface of this diode for receiving the light emitted by the fibre.

The invention will be better understood from reading the following description of illustrative and non-limitative embodiments with reference to the attached drawings, wherein.

Figure 1:
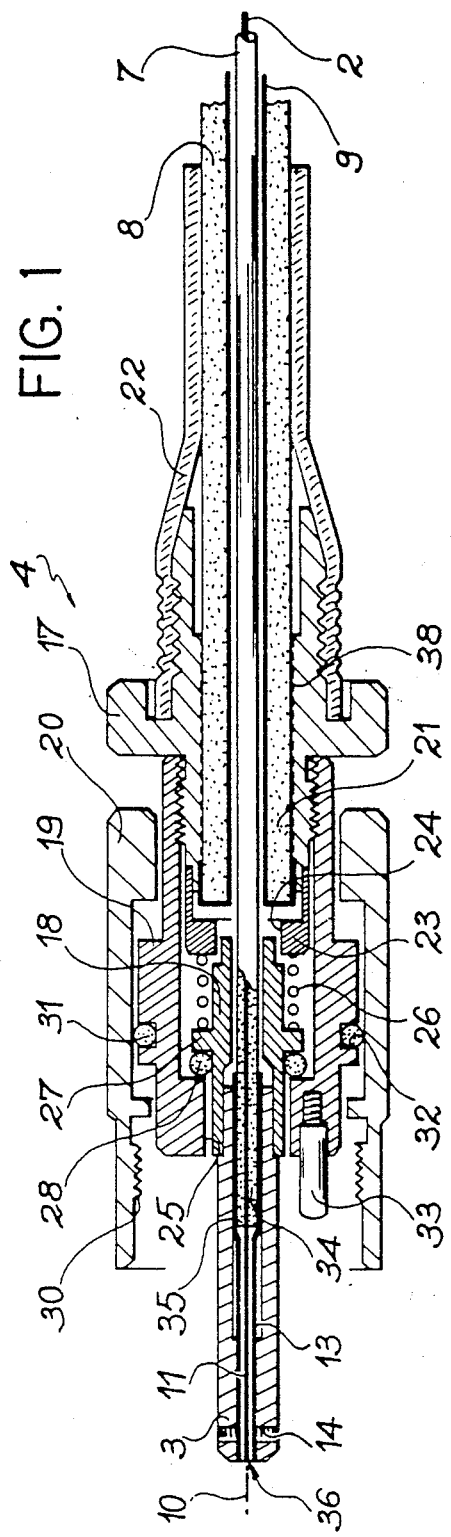
FIG. 1 is a diagrammatic view of a special embodiment of the optical connector according to the invention.
Figure 1A:
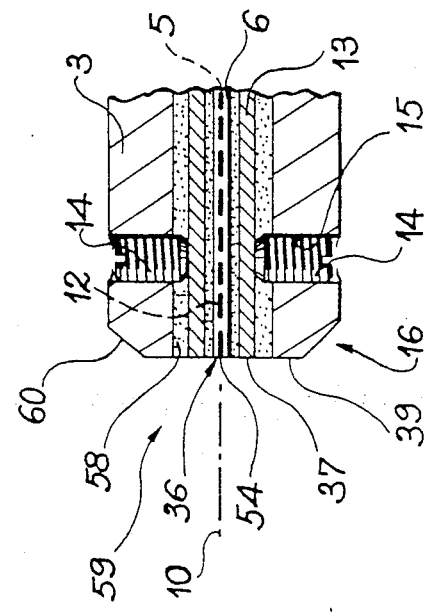

FIG 1 diagrammatically shows a special embodiment of the optical connector according to the invention, which essentially comprises an optical fibre 2, a termination 3 and a mechanical connection assembly 4.

Optical fibre 2 comprises a core 5 surrounded by a sheath 6. The latter is itself encased in a sheath 7, called the inner sheath which is, for example, made from a plastic material. The inner sheath 7 is surrounded by another sheath, 8, called the outer sheath which is also e.g. made from plastic material. The inner sheath 7 has a predetermined axial clearance with respect to the outer sheath 8. The latter is reinforced by wires 9 called "bearers", which serve to prevent the elongation of the sheath and consequently the breaking of optical fibre 2 when the ends thereof are rendered rigidly integral with the outer sheath 8. These bearers 9 are embedded in the plastic material constituting the outer sheath 8 and are located in the vicinity of the inner surface of the latter.

For example, termination 3 is made from steel. Its outer surface adopts the shape of a cylinder of revolution whose axis, called the "termination axis" hereinafter, carries reference numeral 10 in FIG. 1. The connection end 11 of optical fibre 2 is fixed in termination 3 in such a way that the connection end 12 of core 5 of optical fibre 2 coincides with the axis 10 of termination 3. To this end, the connection end 11 of optical fibre 2 is previously bared and is fixed in a rigid protective tube 13, which is e.g. made from metal and provided for the mechanical holding of the fibre. The tube 13 is itself definitively secured in the termination 3 after having been correctly positioned therein by the displacement and fixing means 14, provided on termination 3. These displacement and fixing means 14 are, for example, constituted by adjustment screws able to secure the rigid protective tube 13 along a circumference thereof and are regularly distributed with respect to said circumference. In an illustrative and non-limitative manner, the adjustment screws have a length of 1 mm and a diameter of 1 mm.

There are, for example, four adjustment screws 14 which are respectively screwed into four tapped holes 15, which holes are formed in end 16 of termination 3 for the optical connection and which are respectively oriented along four radials at 90° from one another. FIG. 1 only shows two adjustment screws 14 located in the sectional plane of FIG. 1. The two other adjustment screws 14 are obviously located in a plane perpendicular to that of FIG. 1 and containing axis 10 of termination 3. Moreover, rigid tube 13 is, for example, made from a nickel-copper alloy marketed under the trade name Monel.

The mechanical connection assembly 4 essentially comprises a sheath end fitting or termination 17, a termination holder 18, a box 19 and an attachment member 20, which are hollow members having an axis of symmetry, with the exception of one of the two ends of termination holder 18.

The outer sheath 8 is interrupted to allow the inner sheath 7 to appear and the latter is itself secured in the rigid tube 13, one end of which is widened for this purpose. The sheath end fitting 17 confines the end 21 of outer sheath 8, this being the end in which said outer sheath is interrupted. The sheath end fitting 17 is threaded at its two ends. One threaded end is confined by a thermo-retractable sheath 22 which encases the outer sheath 8 along a portion axially removed from the position of end fitting 17. The other end of the sheath end fitting 17 is coupled to a washer 23 having a square central opening 24 through which inner sheath 7 passes. Box 19 is screwed at one end to the other end of the sheath end fitting 17 and extends beyond washer 23. The other end of box 19 has a central opening 25. The termination holder 18 is contained within box 19 and traversed by the inner sheath 7. One end of the termination holder 18 is mobile in the central opening 25 of box 19. The other end of termination holder 18 has a square cross-section and is mobile in translation in the central opening 24 of washer 23. The end of termination 3, opposite to that carrying screws 14, is fixed into that end of the termination holder 18 which is mobile in central opening 25 of box 19. A return spring 26 surrounds the termination holder 18 and is secured between one side of an annular boss 27 of the termination holder and washer 23. An elastic ring 28 is located on the other side of annular boss 27. This elastic ring 28 serves as a packing when the connector is not connected. This gives an assembly having an axis of symmetry coaxial with axis 10 of termination 3.

The attachment member 20 surrounds box 19 and can move in translation along axis 10. One end of this attachment member 20 has an internal thread 30, making it possible to obtain the connection according to the invention and which will be described hereinafter. A sealing O-ring 31 is placed in an annular slot 32 made on the circumferential surface of box 19 and rubs against the attachment member 20. Thus, termination 3 is mobile in translation along its axis 10 with respect to box 19 and is moved back to its initial position by means of spring 26 when it has been moved away therefrom. Finally, a lug 33, serving as an error prevention means in the connection according to the invention, is fixed to the end of the box 19 which has the central opening 25.

The process according to the invention making it possible to obtain connectors of the type shown in FIG. 1 will now be explained with reference to FIGS. 1 and 2.

To obtain the optical connector of FIG. 1, the initial stage consists of preparing the optical fibre 2 associated with the inner sheath 7 and the outer sheath 8. For example, optical fibre 2 has a diameter of 125 microns and its core has a diameter of 50 microns. The end of the outer sheath 8 is removed, while reserving the bearers 9, so that the inner sheath 7 appears. The end of the latter is then removed, so that the connection end 11 of optical fibre 2 appears. The connection end 11 is then bonded in the rigid tube 13, whose internal diameter is, for example, approximately 200 microns. For this purpose, use is e.g. made of an adhesive sold under the trade mark ARALDITE and the reference AY 103, associated with a hardener whose reference is HY 930. The adhesive-hardener mixture is, for example, injected into the rigid tube 13 with the aid of a syringe. It is pointed out that optical fibre 2 is inserted into rigid tube 13 until it projects therefrom by a few millimeters, e.g. 5 mm. The new end 34 of the inner sheath 7 is also bonded into the rigid tube 13, which is terminated by a widened portion 35 provided for this purpose. The adhesive is allowed to polymerize, e.g. for 24 hours at ambient temperature. The polymerization process can also be accelerated in an oven.

After cutting off the end of the optical fibre projecting from rigid tube 13, the active endface 36 of fibre 2 and endface 37 of rigid tube 13 surrounding said active endface 36 are prepolished. In an informative, but non-limitative manner, it is pointed out that the prepolishing is first carried out with a fine grained abrasive paper (e.g. paper No. 1000 according to French standards), then with a fabric onto whose surface diamond particles are embedded whose size is approximately 1 micron. Once polished, the active endface 36 of the optical fibre 2 and endface 37 of the rigid tube 13 are optically checked, using e.g. a magnifying glass, and then are carefully cleaned.

Outer sheath 8 is then encased by the thermoretractable sheath 22, and then by the mechanical connection assembly 4, after reversing the bearers 9. The part of the latter which is reversed carriers reference numeral 38 in FIG. 1. Obviously, the mechanical connection assembly 4 is completely assembled before being fitted onto the outer sheath 8.

The terination 3 is then fitted onto the rigid tube 13 and the axis of the latter is made to coincide with axis 10 of termination 3 with the aid of adjustment screws 14, which alignment is accompanied by visual inspection, after which the polished endface 37 of rigid tube 13 is brought into the plane of active endface 39 of termination 3 by bearing on rigid tube 13. Obviously, the tightening of the adjustment screws 14 is sufficiently limited so as not to prevent the displacement of tube 13 on bearing on the latter.

Figure 2:
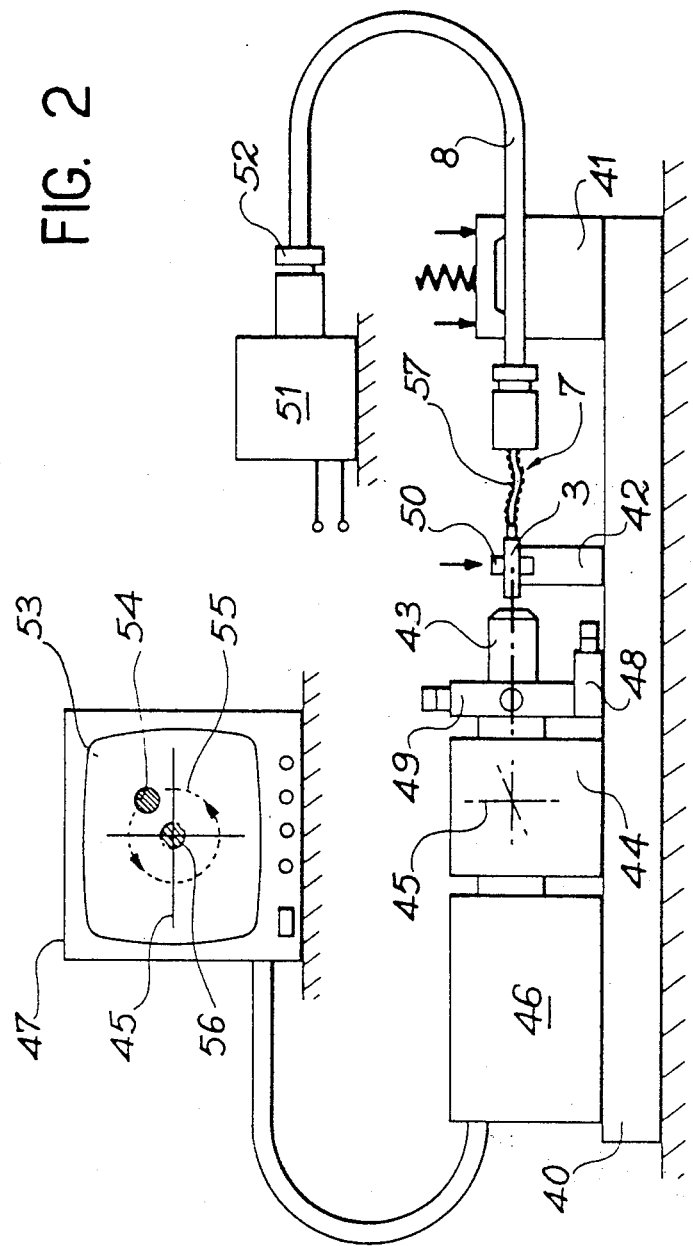
FIG. 2 is a diagrammatic view of an installation making it possible to optically monitor the coincidence between the connection end of the optical fibre core incorporating said connector and the axis of symmetry of the cylinder, whose outer surface is the shape adopted by the connector terminations.

The connection end 12 of core 5 is then made to coincide with axis 10 of termination 3 and this is controlled optically by means of the installation diagrammatically shown in FIG. 2.

This installation successively comprises on a horizontal optical bench 40, means 41 for securing the outer sheath 8, a bearing vee 42 for termination 3, a microscope objective 43, an optical guide or pipe 44 provided with a regulating sighting mark 45 centered on the optical axis of the microscope objective and perpendicular to said optical axis, as well as a television camera 40 connected to a television receiver 47. The receiver 47 makes it possible to observe the image of an object placed in front of objective 43, this image being magnified by the objective and transmitted to camera 46 via pipe 44. The optical axis of the microscope objective 43 is horizontal and is associated with focusing setting means 48, which consist of means for translating the objective in a direction parallel to its optical axis. The microscopic objective 43 is also associated with means 49 for regulating its position, which comprise means for displacing the objective parallel to a vertical plane.

The outer sheath 8 is then fixed by fixing means 41. The mechanical connection assembly 4 is kept engaged with outer sheath 8 and then part of the inner sheath 7 in contact with termination 3 is drawn from the outer sheath. The termination 3 has a sufficient length to position it at the bottom of bearing vee 42, while maintaining it in this position by pressure means 50, the active endface of termination 3 then obviously facing the microscope objective 43.

Using a light source 51, light is injected into the optical fibre core at the other end thereof, said other end being coupled to the light source 51 by connection means 52, which are known in the art. The focusing and positioning of the microscope objective 43 are then adjusted so as to enable observation on screen 53 of receiver 47 of the image of the active endface 54 of core 5 (FIG. 1) of optical fibre 2. By rotating, e.g. manually, the termination 3 in bearing vee 42 (FIG. 2), the active endface 54 of the optical fibre core defines a circle 55 centered on axis 10 of termination 3. It is easily possible to observe this circle on screen 53 of receiver 47, e.g. using an overall magnification of approximately 1000 for the objective-camera-receiver system, which can be obtained with the aid of a magnifying objective and a camera-magnifying receiver system. Adjustment screws 14 (FIG. 1) are manipulated until the radius of circle 55 is zero, or at least so as to make it less than a given value, e.g. approximately 1 or 2 microns. The active endface of the core 5 is then in a position 56 where it essentially rotates in place during turning of the termination 3 on bearing vee 42. In this case, it is certain that the connection end 12 of the core 5 coincides with the axis 10 of termination 3. In order to facilitate the attainment of the coincidence which has just been explained, it is possible to make the optical axis of microscope objective 43 coincide with the axis 10 of termination 3.

To ensure that the optical fibre 2 does not break when part of the inner sheath 7 is drawn out of the outer sheath 8, so as to position termination 3 in bearing vee 42, it is possible to place a reinforcing sheath 57 on sheath 7 before the optical fibre is bonded in the rigid tube 13 (FIG. 1). Due to the clearance existing between inner sheath 7 and outer sheath 8, reinforcing sheath 57 can enter outer sheath 8 at the same time as inner sheath 7 is forced into the outer sheath 8 and after removing the termination 3 from bearing vee 42.

Once the connection end 12 of the core 5 has been made to coincide with axis 10 of termination 3, the rigid tube 13 is bonded into termination 3, e.g. using a dental cement which is injected by way of the front face of termination 3 into the space 58 (FIG. 1) existing between termination 3 and rigid tube 13. Termination 13 is obviously chosen in such a way as to have an internal diameter exceeding the external diameter of rigid tube 13.

This is followed by a so-called "intermediate" polishing of the active endface 39 of the termination 3, the active endface 36 of the fibre 2 and the rigid tube endface 37, so that the assembly constituted by endfaces 36, 37 and 39, which is called the "active endface of the optical connector" and which carries the reference 59 in FIG. 1, forms a planar surface perpendicular to the axis 10 of termination 3. In order to carry out the intermediate polishing, the active endface 59 of the connector is firstly ground on a fine-grained abrasive paper and is then polished on a fabric onto whose surface diamond particles with a size of approximately e.g. 1 micron have been embedded. Intermediate polishing can be carried out with a polishing tool e.g. constituted by a cylinder having a hole, into which is introduced the termination 3 and which is then displaced on the abrasive paper surface and then on the fabric surface.

A check is then carried out to establish whether the optical fibre has remained centered, i.e. coinciding with axis 10 of termination 3 during the operations of bonding the rigid tube into the termination and the intermediate polishing, once again using the inspection installations shown in FIG. 2. It is possible to accept optical connectors whose cores are off-centered by a maximum of 3 microns. The connectors with cores off-centered by more than 3 microns are considered defective, because they lead to insertion losses which can exceed 1 dB.

After checking the centering of the core, the termination 3 is bonded into the termination holder 18 with the aid e.g. of a dental cement. The mechanical connection assembly 4 is then bonded onto the outer sheath 8, after folding end 38 of bearers 9 in the manner shown in FIG. 1 and after coating the periphery of the end of outer sheath 8 with adhesive or cement. For this purpose, it is possible to use a quick-setting adhesive of the type commercially available under the trade mark ARALDITE. Obviously, it is ensured that the termination holder 18 is not adhered to washer 23 so that the termination 3 can move in translation relative to box 19.

This is followed by a so-called "final" polishing of the active endface 59 of the connector using the fabric onto whose surface diamond particles have been embedded, until a glazed polish of active connector endface 59 is obtained. It is then checked that the insertion loss of this optical connector is effectively below 1 dB. Finally, the thermoretractable sheath 22 is retracted in such a way that it secures the corresponding end of sheath termination 17. When the thus-obtained optical connector is not being used, the termination is protected by placing it in a cable tidy (not shown) fitted to said end.

When the clearance between the inner sheath 7 and the outer sheath 8 is too small or zero, which prevents the removal of part of the inner sheath 7 from outer sheath 8, the following operations are successively performed in order to obtain the connector according to the invention. Outer sheath 8 is bared, followed by inner sheath 7, rigid tube 13 is bonded, prepolishing takes place, the thermoretractable sheath 22 is encased onto outer sheath 8, the mechanical connection assembly 4 is fitted and then bonded to outer sheath 8, the termination 3 is bonded into the termination holder 18 while ensuring that the endface of the rigid tube 13 is flush with the active endface of the termination 3. The core 5 is then centered after fitting the termination 3 into bearing vee 42 (FIG. 2) by rotating said termination, the mechanical connection assembly and the outer sheath. This is followed by the bonding of rigid tube 13 in the termination 3, intermediate polishing, checking of the centering, final polishing, checking of the insertion loss and finally retraction of the thermoretractable sheath 22.

Figure 3:
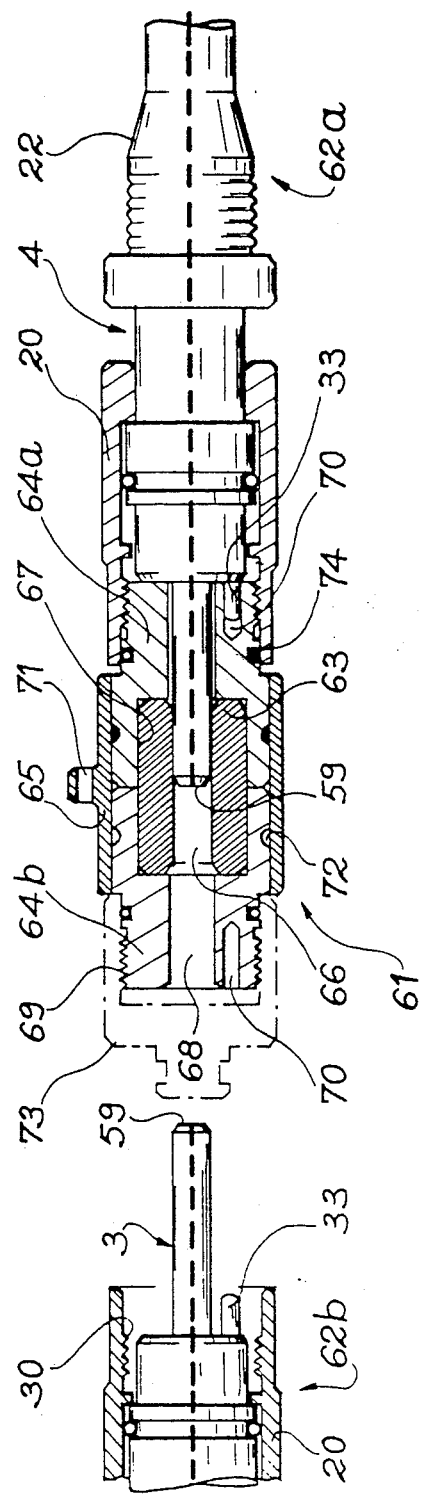
FIG. 3 is a diagrammatic view of a special embodiment of the connecting means making it possible to bring about a monochannel connection according to the invention.

FIG. 3 diagrammatically shows a special embodiment of the connecting means making it possible to obtain a monochannel optical connection according to the invention. Apart from connecting means 61, said connection comprises two identical optical connectors 62a, 62b like the connector of FIG. 1. Connector 62a is shown fitted to the connection means and connector 62b is shown
in section and not fitted on said connection means.

The connection means 61 comprise a centering core 63, two attachment members 64a, 64b and an outer tube 65. The centering core 63 has a calibrated hole able to fix the terminations 3 of optical connectors 62a, 62b. In an illustrative and non-limitative manner, the centering core 63 is made from bronze and hole 66 has a diameter of 3.001–3.002 mm for terminations having a diameter of 2.999–3.0 mm.

The two ends of hole 66 are chamfered and the ends of terminations 3 also have a chamfer 60 (FIG. 1) at their periphery, in order to facilitate the introduction of terminations 3 into hole 66. Moreover, for ease of manufacture, centering core 63 adopts the shape of a cylinder coaxial to hole 66.

Each attachment member 64a or 64b has, on the one hand, a recess 67 which can be fitted onto the centering core 63, i.e. is cylindrical, and which issues on one side of attachment member 64a or 64b, and, on the other hand, a hole 68 having a diameter larger than that of the termination, which is coaxial to and communicates with the recess, and which issues on the other side of the attachment member 64a or 64b.

The attachment member 20 of optical connector 62a (or 62b) is screwed by means of threads 30 onto the outer circumferential surface of said other side of the attachment member 64a (or 64b) forming part of the connection means 61 and for this purpose the outer circumferential surface has threads 69. The attachment members 20 of optical connectors 62a, 62b serve as female attachment members and the attachment members 64a, 64b of connection means 61 act as male attachment members. Moreover, each male attachment member 64a or 64b has a cavity 70 adapted to receive the lug 33 of the corresponding optical connector 62a or 62b, so as to obtain a single attachment angle between the male attachment members and female attachment members. Finally, the holes 68 of the male attachment members 64a, 64b are chamfered in order to facilitate the introduction of terminations 3 into said hole 68.

The outer tube 65 secures the male attachment members 64a, 64b and can have a stud 71 making it possible to attach the connection means 61 to a support (not shown).

The fitting of connections means 61 takes place in the following manner. One of the two male attachment members 64a or 64b is fitted and bonded into the outer tube 65. The outer circumferential surface of each male attachment member 64a, 64b surrounding recess 67 for receiving the centering core 63 has an annular slot 72 for receiving the adhesive. The centering core 63 is then placed in recess 67 of the male attachment member 64a or 64b. Then, the other male attachment member 64b or 64a is fitted and bonded into the outer tube 65, in such a way that the recesses 67 face one another and secure the centering core 63. It is pointed out that the dimensions of the latter are such that it floats in recesses 67. It is possible to provide cable tidies 73, whereof only one is shown in FIG. 3, so as to receive each of the said other ends of the male attachment members 64a and 64b.

In order to obtain the monochannel connection, it is obvious that the cable tidies are removed and the termination 3 of the optical connector 62a or 62b is introduced into hole 68 of male attachment member 64a or 64b and then into hole 66 of centering core 63, followed by the screwing of the female attachment member 20 onto the male attachment member 64a or 64b. Each female attachment member is provided with an abutment in such a way that the box 19 (FIG. 1) is locked against the male attachment member during the aforementioned screwing. The dimensions of the centering core 63 are such that the active endfaces 59 of the two terminations 3, which are perpendicular to the axes of said terminations, come into contact with one another so as to limit insertion losses. Finally, it is possible to provide a joint 74 on the outer circumferential surface of said other side of each of the male attachment members, making it possible to ensure the sealing of proper connection between the male and female attachment members.

Figure 4:
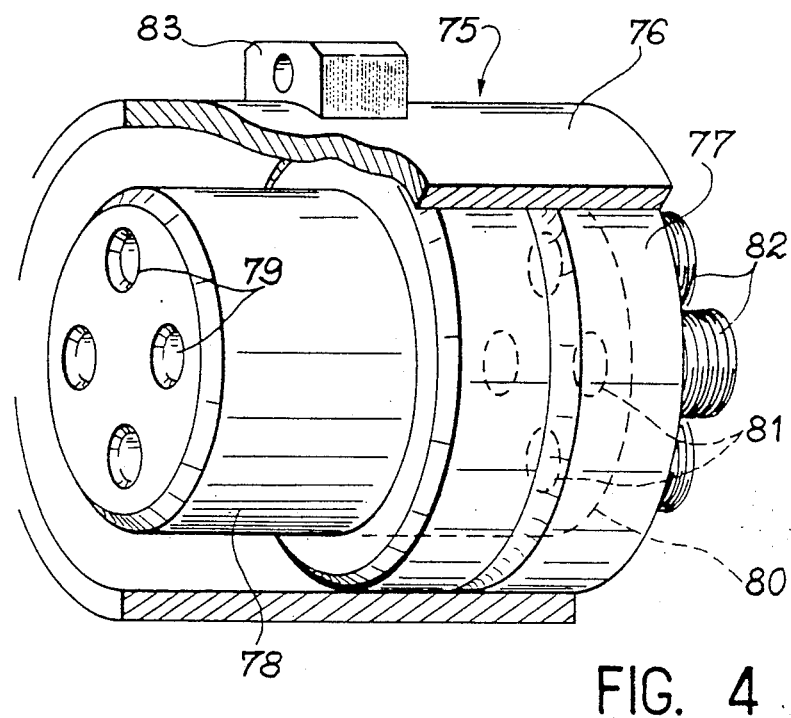
FIG. 4 is a diagrammatic view of a special embodiment of the connection means making it possible to bring about a multichannel connection according to the invention.

FIG. 4 diagrammatically shows a special embodiment of the connection means 75 which makes it possible, according to the invention, to obtain a multichannel connection between optical fibres, i.e. so as to bring about a biunial connection between N pairs of optical fibres. In FIG. 4, the number N is equal to 4.

The connection means 75 constitute a generalization of the connection means 61 shown in FIG. 3. These connection means 75 used for a multichannel connection comprise an outer tube 76, two identical attachment members 77, only one of which is shown in FIG. 4, and a centering core 78.

For example, the multichannel connection is brought about by using eight identical connectors (not shown), which are identical to the connector of FIG. 1, so as to form a first group of four connectors and a second group of four connectors, which are to be combined in biunial manner in the multichannel connection.

The centering core 78 then has four identical, parallel, calibrated holes 79 for receiving the connector terminations. Each attachment member 77 comprises a recess 80 for a floating fitting of the centering core, and four parallel holes 81, which are coaxial to the said recess and communicate therewith. The holes 81 are arranged to be coaxial to the holes 79 of the centering core 78 when the latter is fitted in recess 80 and are used for the introduction of the connector terminations.

The outer circumferential surfaces of parts 82 of each of the attachment members 77, which respectively contain the holes 81, are threaded in such a way that it is possible to respectively screw the female attachment members 20 (FIG. 1) of the connectors thereon in order to obtain said multichannel connection. Thus, the attachment members 77 serve as male attachment members.

The fitting of the connection means for the multichannel connection is carried out in the same way as the fitting of the connection means for the monochannel connection as explained with reference to FIG. 3. One of the male attachment members 77 is fitted and bonded into the outer tube 76 provided for this purpose. The centering core 78 is then fitted into the recess 80 of the male attachment member with an orientation permitting the coaxiality of holes 79 and 81, then the other male attachment member is fitted and bonded into the outer tube 76, such that its holes 81 are coaxial to holes 79 and recesses 80 face one another, the centering core 78 then being secured in said recesses. It is then possible to introduce the connector terminations into the male attachment member holes 81 and then into the holes 79 of centering core 78 associated therewith, the dimensions of the connection means 75 being such that the terminations of the optical connectors to be paired come into contact with one another in order to limit insertion losses. The multichannel connection is then completed by screwing the female attachment members respectively onto said threaded outer circumferential surfaces of the male attachment members ssociated therewith. In FIG. 4, it is also possible to see a stud 83 making it possible to attach outer tube 76 to a support (not shown).

Figure 5:
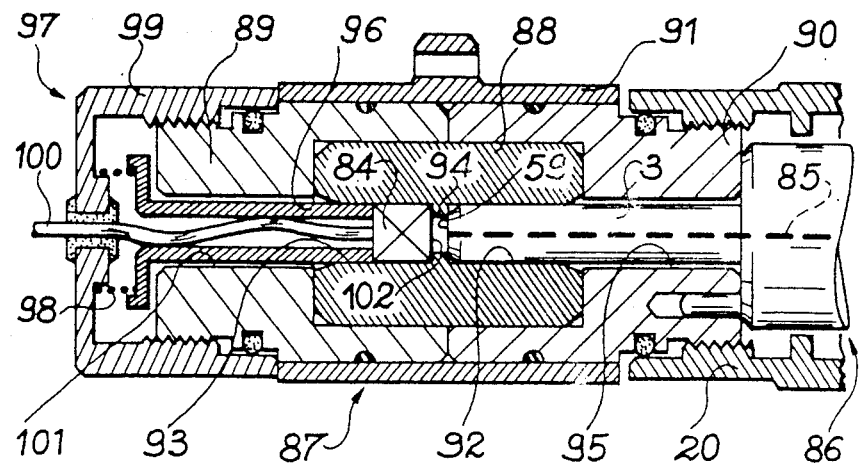
FIG. 5 is a diagrammatic view of a special embodiment of a connection between a diode and an optical fibre according to the invention.

FIG. 5 diagrammatically shows a special embodiment of a connection according to the invention between diode 84 and the optical fibre 85 of an optical connector 86 according to FIG. 1. For example, diode 84 is a light-emitting diode or a laser diode and the light emitted by the diode is injected into optical fibre 85. Obviously, the diode could be a receiving diode, e.g., of the PIN type, which serves to transduce the light emitted by optical fibre 85 into electrical current.

The connection comprises connection means 87 having a centering core 88, an attachment member 89 associated with diode 84, another attachment member 90 associated with connector 86 and an outer tube 91. The connection means 87 between diode 84 and optical fibre 85 are produced and fitted in the same way as the connection means 61 shown in FIG. 3. There is only a slight difference with respect to the centering core. Centering core 88 has two coaxial recesses 92, 93 issuing onto the outside of the centering core and which face and communicate with one another. One of the two recesses 92 is calibrated and serves to receive termination 3 of connector 86. The other recess 93 receives diode 84. An annular shoulder 94 separates the two recesses 92, 93, so as to prevent any contact between the diode and the connector termination 3 and consequently prevent the deterioration of active endface 59 of the connector and the active endface 102 of diode 84. The connection is formed in the following way. Termination 3 is introduced into its recess 92 after passing through a coaxial recess 95 made in attachment member 90. The active endface 59 of the connector is in contact at its periphery (so as not to damage the active endface of the optical fibre) with shoulder 94. The connector is secured relative to the connection means 87 by screwing the female attachment member 20 onto the attachment member 90, which serves then as the male attachment member and which is threaded on the outer circumferential surface of its end connecting recess 95.

The ight-emitting diode 84 has, for example, a "bar" configuration. It is fitted to the end of a hollow bar 96, fixed to a base 97 via a return spring 98. Base 97 is provided with a female attachment member 99 fitted to the attachment member 89 associated with the diode. Sheathed conductors 100 for supplying the diode 84 with electric current pass through the hollow bar 96 and then base 97. The diode is then introduced into a recess 101 formed in the attachment member 89 associated with the diode, then into recess 93 provided for the diode in the centering core 88, the periphery of the active endface 102 of the diode then coming into contact with shoulder 94. The female attachment member 99 on diode base 97 is then screwed onto the attachment member 89 associated with said diode, which acts as the male attachment member and is threaded on the outer circumferential surface of its end containing recess 101. Between the diode and the optical fibre, it is obviously possible to interpose an optical connection (not shown) for focusing the light from the diode onto the active endface of the optical fibre, said optical connection e.g. being fitted to shoulder 94.

It is obviously possible to obtain a biunial connection between N diodes and N optical fibres of optical connectors like that shown in FIG. 1, by using connection means comparable to the connection means of FIG. 4, the centering core then being provided with N pairs of coaxial recesses which face one another and are separated by a shoulder, the recesses of each pair respectively serving to receive a diode and a connector termination, as explained relative to FIG. 5.

The connection means considered in the description of FIGS. 3, 4 and 5 can be free or can be connected to one face of an apparatus, then constituting a panel bushing.

The fibre-fibre or diode-fibre optical connections obtained by means of the present invention make it possible to obtain insertion losses equal to at most 0.8 dB for the connection of index gradient optical fibres having a 50-micron-diameter core. Moreover, when such connections are placed in a liquid medium, they are advantageously able to remain tight when subjected to a pressure up to 0.2 kg/cm² from the liquid. Finally, the manipulation of the optical connectors according to the invention requires no extract precautions and these connectors remain reliable when used under severe climatic conditions, particularly with regard to temperature and humidity.

We claim:

1. A process for producing an optical connector incorporating an optical fiber having a core, a connection end and an other end, a rigid protective tube having an axis in which said connection end of said fiber is fixed, a termination having a substantially cylindrical outer surface and a bore in which said rigid tube is fixed, and means for displacing and fixing said rigid tube relative to said termination such that an axis of said connection end of said optical fiber core is substantially aligned with an axis of said termination, said connection end of said optical fiber, said rigid tube and said termination each having an endface, comprising the steps of:
  (a) bonding said connction end in said rigid tube;
  (b) fitting said termination onto said rigid tube and visually aligning the axis of said termination and the axis of said tube and coupling said termination and said rigid tube by adjusting said displacing and fixing means;
  (c) placing said termination in a bearing vee;
  (d) directing a microscope objective onto said endface of said termination and said endface of said connection end of said optical fiber;
  (e) optically coupling a camera to said microscope objective;
  (f) connecting a receiver to said camera for displaying the image observed by said microscope objective;
  (g) injecting light into said other end of said optical fiber core;
  (h) rotating said termination in said bearing vee such that the image of said injected light exiting said connection end of said optical fiber core describes a circle having a radius on said receiver;
  (i) manipulating said displacing and fixing means and rotating said termination repeatedly until said optical fiber attains a centered position whereat the radius of said circle is substantially equal to zero; and
  (j) bonding said rigid tube to said termination when said optical fiber is at said centered position.

2. The process as defined in claim 1, wherein the step of manipulating said displacing and fixing means comprises turning one of a plurality of adjustment screws which are capable of exerting radially inward displacement forces on the outer circumferential surface of said rigid tube.

3. The process as defined in claim 1, further comprising the following steps:
  (k) polishing said endfaces of said bonded optical fiber, rigid tube and termination after step (j);
  (l) connecting a mechanical connection assembly to said termination; and
  (m) polishing said endfaces of said bonded optical fiber, rigid tube and termination until a glazed polish is obtained.

4. A process for producing an optical connection including first and second optical connectors each having an active endface, each of said optical connectors being produced in accordance with the process defined in claim 1, having the structure as defined in claim 1, and further comprising a mechanical connection assembly connected to said respective termination and adapted to couple to a coupling means, said endfaces of said connection end of said optical fiber, said rigid tube and said termination of each optical connector forming said active endface of said respective optical connector, further comprising the step of optically coupling said active endfaces of said first and second optical connectors using said coupling means including a centering core having a calibrated bore in which said terminations of said first and second optical connectors are inserted, and the step of connecting said centering core to said respective mechanical connection assemblies of said first and second optical connectors, wherein said active endfaces of said optical fibers are in contact so as to be able to transmit light from one optical fiber to the other.

5. The process as defined in claim 4, further comprising the steps of chamfering said endfaces of said terminations and first and second ends of said calibrated bore.

6. A process for producing an optical connection including an optical connector and a photodiode each having an active endface, said optical connector being produced in accordance with the process as defined in claim 1, having the structure as defined in claim 1, and further comprising a mechanical connection assembly connected to said termination and adapted to couple to a coupling means, said endfaces of said connection end of said optical fiber, said rigid tube and termination forming said active endface of said optical connector, further comprising the step of optically coupling said active endface of said photodiode and said active endface of said optical fiber of said optical connector using said coupling means including a centering core having a first bore which is calibrated and in which said termination of said optical connector is inserted and a second bore in which said photodiode is inserted, said first and second bores communicating by way of a third bore having a diameter less than the diameters of said first and second bores, and the step of connecting said centering core to said mechanical connection assembly of said optical connector, wherein said active endfaces of said photodiode and said optical fiber are able to transmit light therebetween and are not in contact.

* * * * *